United States Patent [19]

Jachim

[11] Patent Number: 4,817,450
[45] Date of Patent: Apr. 4, 1989

[54] PRESSURE/TEMPERATURE TEST PLUG ASSEMBLY

[75] Inventor: Edward J. Jachim, Moorestown, N.J.

[73] Assignee: Spedco, Inc., Riverton, N.J.

[21] Appl. No.: 126,483

[22] Filed: Nov. 30, 1987

[51] Int. Cl.[4] .................. G01D 11/00; G01D 11/30; G01K 1/14; G01L 19/00

[52] U.S. Cl. .................... 73/866.5; 73/756; 374/208; 220/375

[58] Field of Search ............ 73/866.5, 756; 374/143–148, 150, 208; 138/90; 251/904; 220/375; 215/306

[56] References Cited

U.S. PATENT DOCUMENTS

| | | |
|---|---|---|
| 1,021,203 | 3/1912 | Matchette ............ 220/375 X |
| 1,581,818 | 4/1926 | Sheffield et al. ......... 220/375 |
| 1,662,189 | 3/1928 | Hyatt .................. 220/375 |
| 2,172,311 | 9/1939 | Thomas ............. 220/375 X |
| 3,797,317 | 3/1974 | Peterson, Jr. ............ 73/756 |
| 3,981,199 | 9/1976 | Moore et al. ............ 73/756 |
| 4,253,488 | 3/1981 | Leverberg .......... 220/375 X |
| 4,261,386 | 4/1981 | Young .................. 220/375 |
| 4,297,891 | 11/1981 | Falcon ................. 73/756 |
| 4,638,668 | 1/1987 | Leverberg et al. ...... 73/756 X |

FOREIGN PATENT DOCUMENTS 1241203 8/1971 United Kingdom ............ 73/756

Primary Examiner—Tom Noland
Attorney, Agent, or Firm—Kevin F. O'Brien

[57] ABSTRACT

A pressure/temperature test plug assembly is disclosed as including a cap retaining device having a chain which interconnects a closure cap for the plug with the plug body in order that the cap will not be lost when measurements are taken at the test plug. The device can be installed simultaneously with the installation of the test plug or can be retro-fit onto existing test plugs.

1 Claim, 1 Drawing Sheet

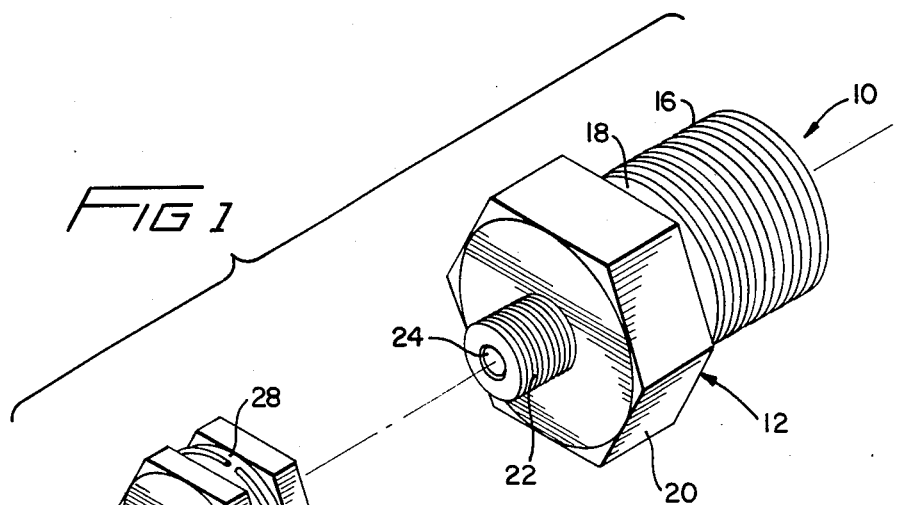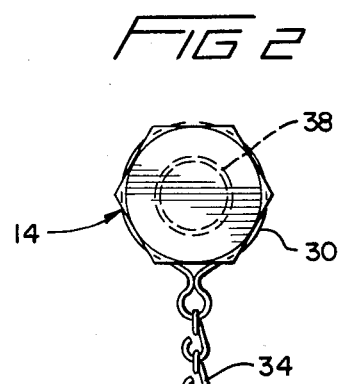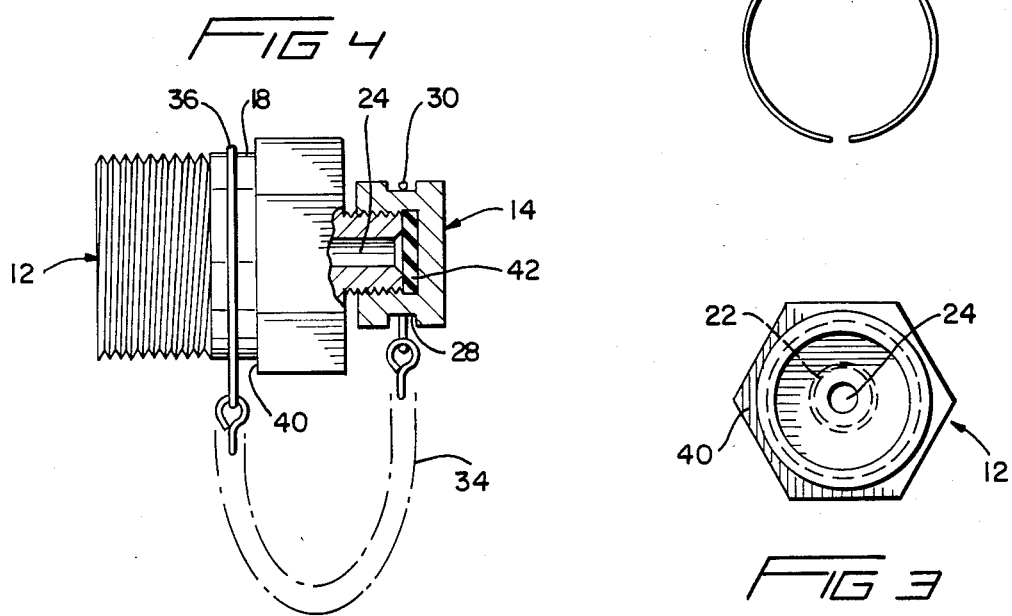

PRESSURE/TEMPERATURE TEST PLUG ASSEMBLY

BACKGROUND OF THE INVENTION

1. Field of the Invention

The invention relates to cap retaining devices and particularly to a device for connecting the cap of a pressure/temperature test plug with the plug so that the cap is not lost when measurements are taken at the valve.

2. Description of the Prior Art

In high pressure heating and cooling systems, it is necessary to routinely perform numerous temperature and pressure tests at various points in the system in order to insure the proper and economical operation of the system. In small systems, temperature and pressure gauges are often permanently installed in the pressure lines at several points in the system. However, in large systems, it is both impractical and cost-inefficient to install gauges at all the necessary points in the system, which can often total as many as 700 to 800 points. Accordingly, most large systems employ test plugs at the necessary test locations throughout the system in order to allow measurements to be made at all of those points. The test plugs are normally closed valves which allow a temperature or pressure probe to be inserted in the line and measurements taken.

U.S. Pat. No. 3,797,317 which is incorporated herein by reference reveals a test plug of the type described. As seen therein, the test plug is inserted into a threaded opening in a pressure line. The plug includes a closure cap which assists the internal valving mechanism in sealing the test plug against leakage when measurements are not being made.

One of the problems associated with the prior art devices is that the closure cap, once removed during the measurement process, is often lost or misplaced.

Numerous devices are known in the art for retaining a cap removed from an opening. An example is U.S. Pat. No. 1,021,203 which discloses a closure for vacuum service inlets having a chain 20 extending between a closure cap 14 and a nipple 1 to prevent the cap 14 from being lost when it is removed from the nipple 1.

U.S. Pat. No. 2,172,311 reveals a valved tap plug having a chain 39 which prevents the plug 34 from being separated from a plug body 12.

SUMMARY OF THE INVENTION

A pressure/temperature test plug assembly in accordance with the invention includes a valve body, a closure cap adapted to seal one end of the valve body, a peripheral groove in the exterior of the closure cap, a first split ring snap-fitting into the groove, a second split ring adapted to snap-fit onto the exterior of the valve body and a chain extending between the first and second split rings to retain the closure cap from separation from the valve body when the closure cap is released from the valve body.

An object of the invention is to provide a pressure/temperature test plug assembly which will prevent the test plug closure cap from being lost during the taking of measurements at the test plug.

Another object of the invention is to provide a test plug closure cap which can be retro-fit onto existing test plugs and will prevent the test plug closure cap from being lost during the taking of measurements at the test plug.

An advantage of the test plug assembly of the invention is that it can be inexpensively manufactured and made readily available for existing test plug installations.

Other objects and advantages of the invention will become apparent from the following description of the preferred embodiment when taken in conjunction with the accompanying drawings.

BRIEF DESCRIPTION OF THE DRAWINGS

FIG. 1 is an exploded perspective view of a pressure/temperature test plug embodying the invention.

FIG. 2 is a left end view of the cap body of FIG. 1.

FIG. 3 is a left end view of the plug body of FIG. 1.

FIG. 4 is a view of the assembled plug in elevation having a fragmented section view of the cap portion of the plug.

DESCRIPTION OF THE PREFERRED EMBODIMENT

A preferred embodiment of a pressure/temperature test plug assembly according to the invention is indicated generally by the reference numeral 10 in FIG. 1. The plug assembly includes a valve body 12 and a protective cap 14. The valve body 12 has an exteriorly threaded lower portion 16 adapted to be received by a threaded opening in a pressure line or vessel where pressure or temperature measurements are to be taken. The threaded portion 16 terminates in an unthreaded area 18 which is integrally joined to a hex-head portion 20 which allows the valve body 12 to be threaded into the opening in the pressure line. An exteriorly threaded upper portion 22 is integrally formed with the hex-head 20 and includes a test probe opening and passageway 24 which recieves a normally closed valve mechanism, not shown.

The protective cap 14, which has interior threads, shown in FIG. 4, sized to mate with the threaded portion 22 on the valve body, includes a hex-head periphery 26 having a milled cylindrical portion 28 receiving a first split ring 30 of a cap retaining device, generally indicated at 32. The ring 30 is connected via a chain 34 to a second split ring 36 which is sized to snap onto the unthreaded area 18 on the valve body 12, adjacent the hex-head surface 40 as shown in FIGS. 3 and 4.

In the preferred embodiment, the test plug assembly 10 is formed of brass and includes a pair of resilient core members, not shown, which provide the normally closed valving action. The outer diameter of the threaded lower portion 16 is typically sized to the industry standards such as ¼ inch, ⅜ inch, or ½ inch diameter. The probe opening 24 is sized slightly larger than ⅛ inch outer diameter such that it is capable of receiving a pressure or temperature probe of ⅛" outer diameter. The protective cap 14, which serves the purpose of both further sealing the valving members and preventing residue build-up at the probe opening 24, is typically a 9/16 inch hex head.

The cap retaining chain 34 is formed from brass wire stock in the preferred embodiment. The split rings 30 and 36 are formed as circular brass rings with a chain receiving notch and are then split at a point 180 degrees opposed from the notch. The brass is sufficiently resilient to allow the rings 30 and 36 to snap back to their circular shape after being deformed to be placed on the cap 14 and valve body 12. The chain 34 is also formed from brass wire stock and includes a series of offset link elements, the end elements of the chain 34 being connected respectfully to the rings 30 and 36.

Referring now to FIG. 2, a left end view of the protective cap 14 of FIG. 1, the cap retaining device 32 is shown attached. As seen therein, the split ring 30 is fit loosely in the cylindrical portion 28 of the cap 14. This loose fit allows the cap 14 to be unthreaded, via the internal threads 38, and removed from the valve body 12, without the need for rotating the ring 30. The ring 30 simply rides in the cylindrical portion 28 while the cap 14 is being removed and thus does not bunch up or restrict the rotation of the cap.

FIG. 3 is a right end view of the valve body 12 of FIG. 1. As shown therein, the probe opening 24 extends the full length of the valve body 12. The bottom surface 40 of the hex-head 20 serves as the retaining surface for the split ring 36 when the cap retaining device is installed. In an initial installation of the pressure/temperature test plug assembly 10, the split ring 36 would be slipped over the threaded portion 16 of the valve body until it contacted the surface 40. The valve body 12, with cap 14 attached would then be threaded into the threaded opening in the pressure line. In a retro-fit application, the ring 36 would be deformed and snapped over the valve body 12 and ride in the unthreaded area 18. The ring 36 is sized such that it is loosely fit around the body 12 such that it will not bunch up when the cap 14 is hanging loosely, via the cap retaining device 32, while temperature or pressure measurements are being taken at the plug. The snap rings 30 and 36 are spaced from each other along a common longitudinal axis defined by the assembly 10.

FIG. 4 illustrates the pressure/temperature test plug assembly 10, in partial section, as it would be installed in a fluid line, not shown. As shown therein, a measurement would be taken at the locations of the assembly 10 in the fluid lines by removing the cap 14 and inserting a probe through the probe opening 24 into the fluid line. While the measurements were being taken, the cap 14 would hang, via the chain 34, from the valve body 12, thus facilitating its easy location and replacement at the completion of the measurements. A resilient washer 42 is located in the interior cavity of the cap 14 to further seal the opening 24 when the cap is in place.

In view of the split ring structure of the cap retaining device, it can easily be installed in reto-fit applications wherein caps from the existing installed plugs would be removed and replaced with the caps 14 formed in accordance with the invention and the rings 36 would be snapped over the valve bodies 12 in situ. It would not be necessary to remove and replace the valve bodies in the pressure lines.

When the cap retaining device of the invention is included in an initial installation of the pressure/temperature plug, it is not necessary to snap fit the ring 36 over the valve body 12 since the ring 36 can be slipped over the threaded portion 16 to the surface 40. The valve body 12 can the be threaded into the opening in the pressure line with the cap retaining device already in place.

It should be understood that the embodiments described hereinbefore represent the preferred embodiments of the invention, numerous changes in detail are possible without departing from the scope of the invention. For example, in corrosive environments it may be desirable to form the assembly from stainless steel rather than brass. Further, the chain 34 could be formed in any appropriate manner, such as bead chain, etc.

Since many modifications, variations and changes in detail can be made to the disclosed embodiments of the invention, all matter described in the foregoing description or shown in the accompanying drawing should be interpreted as illustrative and not in a limiting sense.

What is claimed is:

1. A pressure/temperature test plug assembly (10) comprising a valve body (12) having
    an exteriorly threaded first end portion (16) adapted to be received by a threaded opening in a pressure line,
    an exteriorly threaded opposite second end portion (22),
    a hex head portion (20) integrally formed with and disposed between said first and second end portions (16 and 22),
    an unthreaded portion (18) on said first end portion (16) adjacent the hex head portion (20), and
    said second end portion (22) having a passageway (24) extending through said hex head portion (20) whereby a test probe may be inserted through the second end portion (22), the hex head portion (20) and the first end portion (16),
    a protective closure cap (14) having internal threads engaging said second end portion (22),
    a pair of hex head areas (26) on the exterior of said cap and a peripheral grove (28) therebetween,
    said valve body (12) and said closure cap being aligned along a common longitudinal axis whereby the unthreaded portion (18) and the groove (28) are in axial alignment,
    a resilient seal member (42) disposed internally of said closure cap (14) and abutting said second end portion (22) and thereby sealing said passageway (24) when the closure cap (14) is in a sealing position,
    a split ring (30) snap fitted into said groove (28),
    another split ring (36) snap fitted into said unthreaded portion (18),
    a chain (34) extending between said split rings (30 and 26) to retain the closure cap (14) from separation from the valve body (12) when the closure cap (14) is released from the valve body (12) for a testing operation and when the closure cap (14) is in a sealing position on the second end portion (22).

* * * * *